United States Patent Office 3,383,404
Patented May 14, 1968

3,383,404
ESTERIFICATION OF FATTY DIACIDS
WITH EXCESS HF
Eugene J. Miller, Jr., Wheaton, and Ago Mais, La Grange Park, Ill., assignors, by mesne assignments, to Armour Industrial Chemical Company, Chicago, Ill., a corporation of Delaware
No Drawing. Filed Nov. 9, 1964, Ser. No. 409,967
13 Claims. (Cl. 260—485)

ABSTRACT OF THE DISCLOSURE

Long chain ($C_8$ to $C_{24}$) fatty diacids and their anhydrides are esterified with straight or branched chain primary alcohols using HF in large excess.

This invention relates to the esterification of fatty diacids, and more particularly to a novel method wherein the heretofore difficulty esterifiable fatty diacids may be esterified, in high yield.

Fatty acid esters have attained wide usage in various technologies. Frequently, soaps and detergents contain or even consist wholly of one or more fatty acid esters. Plasticizers for plastic may comprise singular or mixed fatty acid esters. Drying oils for paints and waxes depend upon the polymerization of their unsaturated fatty acid ester component to function. The newer plastics, such as the polyesters, comprise long chain polymers of acid esters. Such large scale usage should indicate to the reader that any improved method in synthesis of esters would be highly desirable.

Broadly, esterification is a fairly common practice in chemical synthesis. Two general techniques are usually involved. In the first, an organic acid is added to the double bond of an olefin. In the second, an organic acid is reacted with an organic alcohol to form the ester and water. In both, a catalyst is usually employed. And, while there are many known esterification catalysts, it appears that only certain ones are useful in one or the other techniques described above.

As reported in the Encyclopedia of Chemical Technology, volume 5, pages 787 and 788 (1950), many so called "esterification catalysts" exist. However, in actual practice and as noted therein, many of these catalysts are undesirable because they are either corrosive, or cause side reactions such as dehydration, isomerization, or polymerization, or are slow, or cause poor yields especially where the reactants are fairly complex or where they are long chain compounds.

For example, in U.S. Patent 2,414,999, ethyl acetate is produced from glacial acetic acid and ethylene in only a 49% yield using a mixed $BF_3$-HF catalyst. Other reports and patents indicate only similar or possibly slightly better yields, but in no instance are the yields exceptional. Fatty diacids are even worse. It is well known that esterification of fatty diacids is, at best, most difficult and time consuming. Since fatty diacid esters are extremely useful in polymer work because of their difunctional nature, better yields would be most desirable. While much effort has been expended along these lines, not much has really been accomplished toward improving yield.

An object of this invention is to provide a novel esterification process.

Another object is to provide an esterification process of long chain fatty diacids having exceptional yields, even quantitative.

A further object is to provide an esterification process which uniquely utilizes liquid HF as a catalyst and as a reaction medium.

Another object is to provide an esterification process for fatty diacids which is surprisingly short in time and uses relatively mild reaction conditions.

Other objects of the invention will in part be obvious and will in part appear hereinafter.

The invention accordingly comprises the several steps and the relation of one or more of such steps with respect to each of the others, and the compound possessing the features, properties, and the relation of elements, which are exemplified in the following detailed disclosure, and the scope of the invention will be indicated in the claims.

It has now been found that long chain ($C_8$ to $C_{24}$) fatty diacids (including their anhydrides), such as carboxystearic acid, may be esterified with straight or branched chain primary alcohols in high yield, sometimes even quantitative, by utilizing liquid hydrogen fluoride (HF) as both a catalyst and a reaction medium. Relatively mild reaction temperatures may be used over a relatively short period of time to promote esterification. The yield produced is substantially quantitative and ranges upward of 90% of the fatty diacid utilized. For example, carboxystearic acid can be almost quantitatively esterified with n-butanol by adding a mixture of both reactants to liquid HF at $-10°$ to $0°$ C. over a period of 15 minutes followed by stirring for an additional 2.5 hours at room temperature. Previously, not only was carboxy-stearic acid hard to esterify, but also extremely long reaction time, in the nature of days, was required. Now, the time has been cut to approximately 3 hours. In addition, no side reactions, polymerization, isomerization or degradation of the reactants or of the finished ester is noted. This probably accounts for the good yield obtained.

The invention more aptly described by reference to specific examples which illustrate the variations that can be used if desired:

EXAMPLE I.—DI-n-BUTYL CARBOXYSTEARATE

A 500 ml. round bottom copper flask, equipped with mechanical stirrer, thermocouple and addition funnel, is charged with 100 gms. (5 moles) of liquid anhydrous hydrogen fluoride at $-10°$ C. A solution of crude carboxystearic acid (60.0 gms., 0.174 mole; NE, 172.5) in n-butanol (60.8 gms. 0.82 mole, 75 ml.) is added at $-10°$ to $0°$ C. over a period of 15 minutes with vigorous stirring. The temperature is raised to $20°$ C. in five minutes and maintained there for 2.5 hours. The reaction mixture is then poured into 1500 ml. of cold water. One liter of ether is then added. The organic phase is separated and washed eight times with 250 ml. portions of salt water. The ether solution is dried over anhydrous sodium sulfate and concentrated in vacuo to give 78.5 gms. of pale yellow oil (acid value 5.26), which comprises di-n-butyl carboxystearate.

Table of physical and chemical properties

SOLUBILITY DATA (WEIGHT TO WEIGHT BASIS) AT 25° C.

| Solvent: | Percent |
|---|---|
| Isopropanol | 10 |
| Benzene | 10 |
| Iso-octane | 10 |
| Kerosene | 10 |
| Skellysolve F | 10 |
| Mineral oil | 10 |
| Water | Insoluble |

PHYSICAL PROPERTIES

| | |
|---|---|
| Theor. mol. wt. | 440.1. |
| $n_D^{20}$ | 1.4515. |
| NE | |
| B.P., ° C. | 200–210 at 0.2–0.4 mm. Hg. |
| Color and appearance | Gardner 2, liquid. |
| Relative density, $d_{25}^{25}$ | 0.9114. |
| Viscosity, cps. at 25° C. | 20.43. |
| Surface tension, dynes/cm. (25° C.) | 24.90. |

EXAMPLE II.—DICETYL CARBOXYSTEARATE

A 600 ml. polyethylene beaker, equipped with a magnetic stirrer and thermocouple, is charged with anhydrous liquid hydrogen fluoride (200 gms., 10.0 moles) at 0 to −5° C. Cetyl alcohol (64.0 gms., 0.26 mole) is added to the stirred HF and the temperature is raised to about 5° to 10° C. resulting in a clear yellow solution. This mixture is then poured into a 500 ml., round-bottom copper flask equipped with a mechanical stirrer and thermocouple. Crude carboxystearic acid (23.2 gms., 0.066 mole, NE 176.5) is then added at 8° to 10° C. over a period of 20 minutes. The temperature is raised to 20° C. and maintained there for 40 minutes. The mixture is then cooled to 0° C. and poured into 1500 ml. of cold water. One liter of ether is then added and the organic phase separated and washed seven times with 250 ml. portions of water. The ether solution is dried over anhydrous sodium sulfate and concentrated under reduced pressure. Excess cetyl alcohol is distilled off in vacuo to yield 51.6 gms. of dicetyl carboxystearate. (Acid value 0.37.)

EXAMPLE III.—DIISOCETYL CARBOXYSTEARATE

A two liter round bottom copper flask equipped with a mechanical stirrer, thermocouple well and addition funnel is cooled to −5 to −10° C. and charged with 300 gms. (15.0 moles) of liquid anhydrous hydrogen fluoride. A solution of distilled carboxystearic acid (203 gms., 0.6 mole; NE, 169) in commercial hexadecyl alcohol (isocetyl) (583 gms., 2.40 moles) is then added dropwise with vigorous stirring at −5 to 24 C. over a one hour period. The reaction mixture is then cooled to 5° C. and an additional 50 gms. of liquid hydrogen fluoride is added. Stirring is then continued for another hour and forty-five minutes. The reaction mixture is again cooled to 0° C., then poured into four liters of water. Two liters of ether are added, the ethereal layer is separated and washed with seven 250 ml. portions of salt water. The ether layers are then dried over anhydrous sodium sulfate and the ether stripped therefrom under reduced pressure. The excess hexadecyl alcohol is then removed by distillation in vacuo to give an almost quantitative yield (467.4 gms.) of diisocetyl carboxystearate (acid value [AV]=8.5). Molecular distillation of the crude product results in an almost water-white oil with no odor.

Analysis:

| | |
|---|---|
| Acid value | 0.41 |
| $n_D^{20}$ | 1.4630 |
| Viscosity, centipoises (25° C.) | 280.8 |
| Surface tension, dynes/cm.² (25° C.) | 29.40 |
| Density, gm./cm.² | 0.884 |
| Pour point | −20° F. |

The high viscosity of diisocetyl carboxystearate, coupled with its low pour point, combine to make the product useful as a viscosity builder for synthetic lubricants.

EXAMPLES IV TO VIII

In varying the time, temperature, and stoichiometry of the hydrogen fluoride catalyzed esterification of carboxystearic acid with n-butanol to determine the effect on the final product as indicated by the acid value, the following results are obtained:

TABLE I

| Alcohol | Mole ratio acid:alc:HF | Time (hours) | Temp., ° C. | Acid value |
|---|---|---|---|---|
| n-Butyl | 1:4.72:28.7 | 2.5 | 18–20 | 5.26 |
| Do | 1:4:338 | (1) | 10 | 13.64 |
| Cetyl | 1:4:88.4 | 2 | 20–30 | ² 3.75 |
| Do | 1:4:29.2 | 2.5 | 7–15 | 8.5 |
| Do | 1:4:76 | 1 | 20 | 0.4 |

¹ One minute.
² Excess cetyl alcohol still present.

From the above table, and other data, it is evident that higher reaction temperatures result in products with higher acid values, which is obviously undesirable, increasing amounts of alcohol result in lower acid values, which is desirable, and, while longer reaction times and additional hydrogen fluoride (over 80 moles) appear to have little effect on the acid values, work-up by heating vs. water-dilution techniques results in small increases in acid values and some darkening of product. Thus, it can be concluded that the moderate temperature conditions indicated hereinafter (in detail), as being operable, are quite important for good product and good yield.

The reaction described above is applicable to all fatty diacids falling within the following formula:

(Formula I)

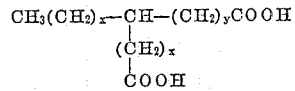

where $x+y=6$ to 22, $z=0$ to 1 such as carboxycaprylic acid, carboxycapric acid, carboxyundecanoic acid, carboxylauric acid, carboxymyristic acid, carboxypalmitic acid, carboxystearic acid, carboxyarachidic acid, carboxybehenic acid and carboxylignoceric acid, or mixtures thereof, such as found in the natural fats and oils such as tallow, soybean oil and coconut oil.

Among the alcohols that may be used to esterify the above acids are the straight and branched chain primary alcohols having from 1 to 24 carbon atoms. Examples of such alcohols are methyl alcohol, ethyl alcohol, propyl alcohol, butyl alcohol, isobutyl alcohol, pentyl alcohol, isopentyl alcohol, hexyl alcohol, 3-methylpentyl alcohol, 2,2-dimethylbutyl alcohol, heptyl alcohol, octyl alcohol, 2-ethylhexyl alcohol, nonyl alcohol, decyl alcohol, cetyl alcohol, isocetyl alcohol, and the like. The molar ratio of alcohol to acid should range from 2 to 1 to 8 to 1.

The amount of catalyst-solvent, HF, employed should range between 15 to 500 moles of the fatty diacid utilized.

The temperature of reaction may range from −20° to +60° C. followed by stirring at temperatures between −20° to +60° C.

After formation, the ester is separated by the usual separation techniques such as dilution with water and separation with or without the aid of extraction solvents, such as ether, skellysolve, benzene, chlorinated hydrocarbons, or any other suitable solvent. Prior to such separation and/or extraction from the ester, the organic layer may be purified and/or washed. Alternatively, the HF and excess alcohol may be removed by distillation without water dilution and solvent extraction.

It will thus be seen that the objects set forth above, among those made apparent from the preceding description, are efficiently attained and, since certain changes may be made in carrying out the above method set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

What is claimed is:

1. The method of esterifying long chain fatty diacids falling within the following formula:

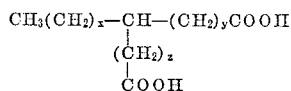

where $x+y=6$ to $22$, $z=0$ to $1$ and their anhydrides in high yield with straight and branched chain primary alcohols comprising adding a selected diacid of said fatty diacids and at least one selected alcohol of said straight and branched chain primary alcohols to a substantially molar excess of liquid hydrogen fluoride to said diacid reactant and then separating the resultant ester of said long chain fatty diacid from the reaction mix.

2. The method of claim 1 wherein the quantity of said liquid hydrogen fluoride comprises 15 to 500 moles of the fatty diacid.

3. The method of claim 1 wherein the molar ratio of alcohol to acid ranges from 2 to 1 to 8 to 1.

4. The method of claim 1 wherein the temperature of the reaction mix is maintained between $-20°$ to $+60°$ C.

5. The method of claim 1 wherein the fatty diacid comprises carboxystearic acid.

6. The method of claim 1 wherein the fatty diacid comprises a mixture of carboxy fatty acids as derived from tallow.

7. The method of esterifying long chain fatty diacids falling with the following formula:

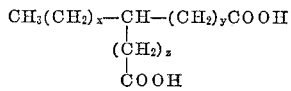

where $x+y=6$ to $22$, $z=0$ to $1$ and their anhydrides in high yield with straight and branched chain primary alcohols comprising adding a selected diacid of said fatty diacids and at least one selected alcohol of said straight and branched chain primary alcohols to liquid hydrogen fluoride, said hydrogen fluoride being in a mole ratio of 15 to 500 moles of the fatty diacid utilized, maintaining the resultant mixture at a temperature from $-20°$ to $+60°$ C. during the esterification reaction, thereafter stirring said mixture at said temperature to complete the esterification reaction, and then separating the resultant ester of said long chain fatty diacid from said mixture.

8. The method of esterifying long chain fatty diacids falling within the following formula:

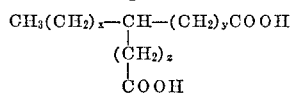

where $x+y=6$ to $22$, $z=0$ to $1$ and their anhydrides in high yield with straight and branched chain primary alcohols comprising adding a selected diacid of said fatty diacid and at least one selected alcohol of said straight and branched chain primary alcohols to liquid hydrogen fluoride, said hydrogen fluoride being in a mole ratio of 15 to 500 moles of the fatty diacid utilized, maintaining the resultant mixture at a temperature from $-20°$ to $+60°$ C. during the esterification reaction, thereafter stirring said mixture at said temperature to complete the esterification reaction, and then separating the resultant ester of said long chain fatty diacid from said mixture by diluting the reaction mix with water, extracting the formed ester with a solvent and then evaporating the solvent to obtain the ester.

9. The method of esterifying long chain fatty diacids falling within the following formula:

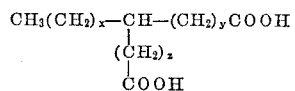

where $x+y=6$ to $22$, $z=0$ to $1$ and their anhydrides in high yield with straight and branched chain primary alcohols comprising adding a selected diacid of said fatty diacids and at least one selected alcohol of said straight and branched chain primary alcohols to liquid hydrogen fluoride, said hydrogen fluoride being in a mole ratio of 15 to 500 moles of the fatty diacid utilized, maintaining the resultant mixture at a temperature from $-20°$ to $+60°$ C. during the esterification reaction, thereafter stirring said mixture at said temperature to complete the esterification reaction, and then separating the resultant ester of said long chain fatty diacid from said mixture by distilling off the hydrogen fluoride and the excess alcohol.

10. The method of esterifying carboxystearic acid falling within the following formula:

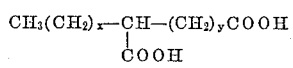

where $x+y=15$ in high yield with n-butyl alcohol comprising adding said acid and said alcohol in a molar alcohol to acid ratio of 2 to 1 to 8 to 1 to liquid hydrogen fluoride, said hydrogen fluoride being in a mole ratio of 15 to 500 moles of the fatty diacid utilized, maintaining the resultant mixture at a temperature from $-20°$ to $+60°$ C. during the esterification reaction, thereafter stirring said mixture at said temperature to complete the esterification reaction, and then separating the resultant ester of said long chain fatty diacid from said mixture.

11. The method of esterifying carboxystearic acid falling within the following formula:

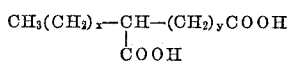

where $x+y=15$ in high yield with isocetyl alcohol comprising adding said acid and said alcohol in a molar alcohol to acid ratio of 2 to 1 to 8 to 1 to liquid hydrogen fluoride, said hydrogen fluoride being in a mole ratio of 15 to 500 moles of the fatty diacid utilized, maintaining the resultant mixture at a temperature from $-20°$ to $+60°$ C. during the esterification reaction, thereafter stirring the resultant mixture at said temperature to complete the esterification reaction, and then separating the resultant ester of said long chain fatty diacid from said mixture.

12. Dicetyl carboxystearate.

13. Diisocetyl carboxystearate.

References Cited

Batzer et al.: Chem. Ber., vol. 83 (1950), pages 340–45.

HENRY R. JILES, *Primary Examiner.*